(No Model.)

R. J. JONES.
CAN OPENER.

No. 495,041.  Patented Apr. 11, 1893.

Witnesses
Oscar G. Michel
W. P. Garrabrants

Inventor:
Richard J. Jones.
By Drake & Co Atty's

UNITED STATES PATENT OFFICE.

RICHARD J. JONES, OF NEWARK, NEW JERSEY.

CAN-OPENER.

SPECIFICATION forming part of Letters Patent No. 495,041, dated April 11, 1893.

Application filed July 9, 1892. Serial No. 439,463. (No model.)

*To all whom it may concern:*

Be it known that I, RICHARD J. JONES, a citizen of the United States, residing at Newark, in the county of Essex and State of New Jersey, have invented certain new and useful Improvements in Milk-Can Openers and Receptacles; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The objects of this invention are to provide a milk can opener and holder convenient for use upon a dining table, to enable the milk-can to be opened with facility and ease, to keep the opened can protected when not in use from flies and other insects and so that the condensed milk will not evaporate or dry up, and to secure other advantages and results some of which will be referred to in connection with the description of the working parts.

The invention consists in the improved milk can opener and holder and in the arrangements and combinations of parts substantially as will be hereinafter set forth and finally embodied in the clauses of the claim.

Figure 1:
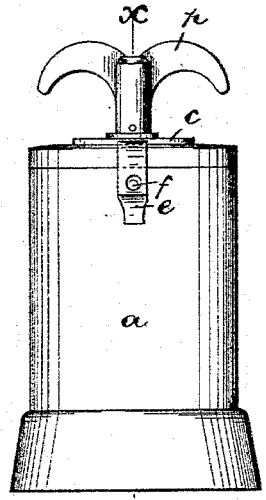
Figure 2:
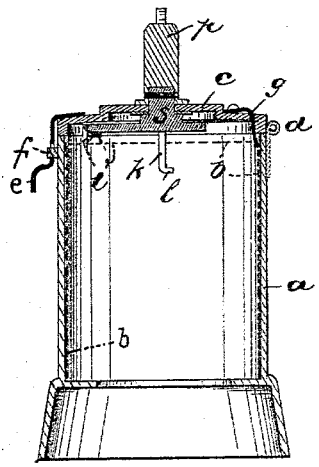
Figure 3:
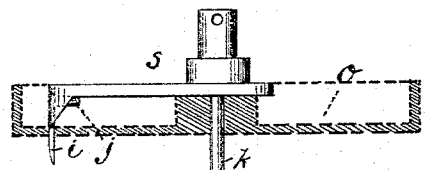
Figure 4:
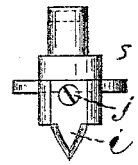
Figure 5:
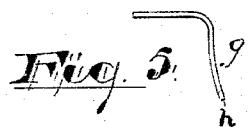
Figure 6:
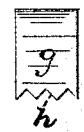

Referring to the accompanying drawings in which like letters indicate corresponding parts in each of the several views, Figure 1 is a side elevation of the improved milk-can opener and holder. Fig. 2 is a central vertical section of the same taken on line $x$. Fig. 3 is a side elevation of a certain cutter head and Fig. 4 is an end view of the same, and Figs. 5 and 6 are detail views of a certain holding spring to prevent the milk can from turning within the holder.

In said drawings, $a$ indicates a hollow, cylindrical receptacle, of a size adapted to receive a can of a size and shape corresponding with those commonly employed in packing and storing small quantities of condensed milk, the said can being indicated, at $b$, in Fig. 2, in dotted outline.

$c$ indicates a cover to the cylindrical body which is hinged to said body as shown at $d$, and at the opposite side is provided with a catch, preferably a spring catch, $e$, adapted to enter automatically into holding relation to the co-operating catch, $f$, on the said body, and to hold the said cover firmly and securely against the force exerted in cutting the opening in the can top.

$g$ indicates a can holding spring secured to the cover and adapted, when the cover is closed, to press hard upon the can and hold the same immovably in place while the cutter is at work upon the can top. This holding device may be other than a spring and may be formed or constructed in any suitable manner, but for convenience and simplicity, I prefer the spring attached to the cover. When the spring is employed, I may serrate the extremity which bears on the can as indicated at $h$, in Fig. 6, to secure a more perfect holding contact.

At the center of the cover, is arranged a cutter head, $s$, having pivotal bearings in said cover and on the outside, said head is provided with a finger piece, $p$, to enable the same to be turned. On the inside the head extends to or near to the periphery of the can and is provided with a cutter or blade, $i$, preferably held on said head by a set screw $j$. When the cover is closed down the blade enters through the sheet metal top plate of the can and, when the head is turned, a discous piece is cut as will be evidently understood. The said head is provided with a disk-holder, $k$, which consists of an arm, which also perforates the top metal prior to cutting, and is provided with means such as the hook or projection $l$, for holding said disk thereon and preventing its falling into the can. When the disk is cut as described and removed from the receptacle, the latter serves as a cover for the can convenient for opening when the said can is to be dealt from. The receptacle is preferably made of an ornamental design and finish suitable for table use.

I may line the inside of the cover with a disk-like piece, $o$, as indicated in outline in Fig. 3, which is attached to the cutter head and revolves therewith and thus tends to give a better finish to the inner side of the cover.

The operation of the device being simple and having been already referred to, further description is deemed unnecessary.

Having thus described the invention, what I claim as new is—

1. In combination, a vessel to receive and cover the can, a clamp for holding the same stationary therein a cutter and a holder for the secured piece, substantially as set forth.

2. In combination, a vessel to inclose the can, a holder for the same, a rotary cutter attached to the cover and adapted to be thrust into said can, when the cover is closed down, and means for turning the cutter, substantially as set forth.

3. In combination, the cylindrical body and hinged cover having catches, a cutting head having a disk holder and cutter thereon and means for preventing the can from turning in the holder, substantially as set forth.

4. In combination the cylindrical body, a hinged cover having central bearings, a cutter head arranged in said bearings and having a finger piece on the outside and a cutter on the inside, substantially as set forth.

5. In combination with the body adapted to receive and cover the can, a cover having thereon an automatic catch and a cutter head with its cutter adapted to perforate the top plate of said can when said cover is forced to its closed position, whereby the catching of the cover and the perforation of the top plate are simultaneously effected.

6. In combination, the body and cover, adapted to inclose and conceal the milk can, a cutter head and its cutter adapted to sever a piece from the can or cut open the same and a can holding spring, arranged and operating substantially as set forth.

7. In combination, the body, hinged cover, cutter head, holding spring having extremity to engage the can, and a disk-like piece or lining attached to the cutter head and revolving therewith substantially as set forth.

8. The improved can opener and holder herein described, combining therein a cylindrical body adapted to inclose a milk can, a cover for the same, catching means for holding the cover firmly on said body, a cutter head having an eccentric cutter and a holding arm for the severed disk on the inside and a finger piece on the outside and a clamp also attached to said cover and adapted to bear down on can, substantially as set forth.

In testimony that I claim the foregoing I have hereunto set my hand this 7th day of July, 1892.

RICHARD J. JONES.

Witnesses:
CHARLES H. PELL,
OSCAR A. MICHEL.